(No Model.)
M. E. COOK.
DRAFT HARNESS.
No. 355,591. Patented Jan. 4, 1887.
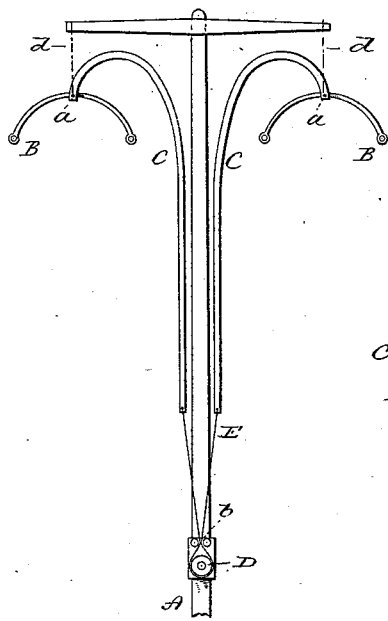
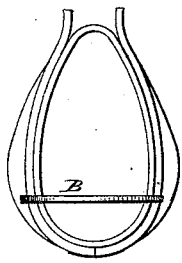
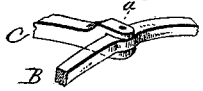
Witnesses,
J. H. Shumway,
Fred C. Earle
Marcus E. Cook, Inventor
By Atty,
Wm. E. Earle

UNITED STATES PATENT OFFICE.

MARCUS E. COOK, OF WALLINGFORD, CONNECTICUT.

DRAFT-HARNESS.

SPECIFICATION forming part of Letters Patent No. 355,591, dated January 4, 1887.

Application filed November 4, 1886. Serial No. 217,931. (No model.)

*To all whom it may concern:*

Be it known that I, MARCUS E. COOK, of Wallingford, in the county of New Haven and State of Connecticut, have invented a new Improvement in Draft-Harness; and I do hereby declare the following, when taken in connection with accompanying drawings and the letters of reference marked thereon, to be a full, clear, and exact description of the same, and which said drawings constitute part of this specification, and represent, in—

Figure 1, an under side view of the carriage-pole, looking up, showing the draft-harness in place; Fig. 2, a front view of a collar and hames, showing the yoke attached; Fig. 3, a perspective view of the yoke and draft-rod enlarged, showing the hinged connection.

This invention relates to an improvement in harness for attaching a pair of horses to a carriage, agricultural implement, or to whatever it be desired to attach a pair of horses, the object being to avoid the usual connections, and at the same time make the draft of both horses equal; and the invention consists in a pair of yokes, one of which is adapted to be attached to each horse across the breast, combined with a draft-rod hung centrally to the yoke in front and turned inward and backward on the inner side of the horse, the said rods attached to the vehicle at the rear.

In illustrating the invention I show it as applied to the pole of a carriage.

A represents the pole of a carriage, this being all the part of a carriage necessary to be represented in illustrating the invention. At the forward end the pole is provided with the usual holdback devices.

B B represent two metal yokes of suitable curved shape, and adapted to be attached by each end to the harness and extend across the breast of the horse. The attachment to the harness may be directly and rigidly to the hames, as seen in Fig. 2. The curved shape of the yokes must be sufficient to clear the breast of the horse in front.

To the forward side of each yoke the draft-rod C is hung, as at *a*. The connection between the draft-rods and the yokes is best made in the form of a hinge, as seen in Fig. 3, and so as to leave the yoke and rods free for play upon the joint between the two. Any suitable joint-connection, however, may be employed between the two; but the joint should be of such a nature as to support the draft-rod in its natural plane, and so as to prevent its turning downward to swing against the horse.

From the joint the rod extends slightly forward, and then curves to the inner side of the horse and extends backward, the draft-rod being alike on both horses and the rod of the two standing substantially parallel with the pole between the horses, the rear ends of the two rods attached to the pole, but so as to give freedom of movement to the horses.

In use the draft comes upon the hames or at the breast, the same as in other draft-harness; but there are no traces extending backward to interfere with the proper working of the horse, and as the holdback may be made directly from the collar the only part of the harness which is necessary for the horse is the collar and hames, to which the yoke is fixed.

That the horses may work evenly, I arrange a pulley, D, on the pole at the rear, and connect the two ends of the rods C C by a chain or other flexible connection, E, extending around the said pulley, so that the pull of both horses will come around the pulley and the draft will be equal, irrespective of the advanced position of either horse. The pulley may be arranged in a suitable support, so as to prevent the connection E from running off the pulley; and this may be done by applying guide-pulleys *b b* forward of the principal pulley D, and between which the connections may run freely; or other known devices to prevent the escape of the connection from the pulley may be employed.

While the pulley is the best device around which to connect the draft-rods, it will be understood that it may be any device around which the connection can freely play, and by the term "pulley" I wish to be understood as embracing any of the known equivalents therefor.

The holdbacks may be connected directly to the yoke, as indicated at *d*, and the draft-rods and yokes remain fixed to the pole, the yokes being detached from the hames, so that the yokes always stand in position ready for the horse. This specially adapts the device for the use of steam fire apparatus or other places where hasty "hitching up" is desirable.

So far I have described the invention as applied to a vehicle in which a pole extends forward between the horses; but for other purposes—as for plowing and kindred work, horse-cars, and wherever the horses are harnessed to draw together without a pole—the draft-rods extend back to the usual place for attaching the draft, and a pulley may be applied at that point, around which the two rods may be connected, as I have described, with reference to the pole.

It will of course be understood that the yokes, as well as the draft-rods, are to be proportionately strengthened for the work required.

I claim—

1. The herein-described draft-harness, consisting of the yoke B, adapted for attachment to the harness of the horse, and so as to stand forward of the breast of the horse, combined with a draft-rod, C, hinged forward to the yoke and extending therefrom inward and rearward, adapted for attachment to the point from which the draft is to be taken, substantially as described.

2. The combination of the two yokes B, each adapted for attachment to the harness of a horse and extending in front of its breast, a draft-rod, C, hinged forward to each of said yokes, each turned inward and extending rearward, connected around a pulley at the point from which the draft is to be taken, substantially as described.

MARCUS E. COOK.

Witnesses:
FRANCIS C. BARTHOLEMEW,
HENRY MARTIN.